Aug. 11, 1942.  H. E. JONES  2,292,641
GROUND SPEED INDICATOR FOR AIRCRAFT
Filed Feb. 28, 1938   2 Sheets-Sheet 1
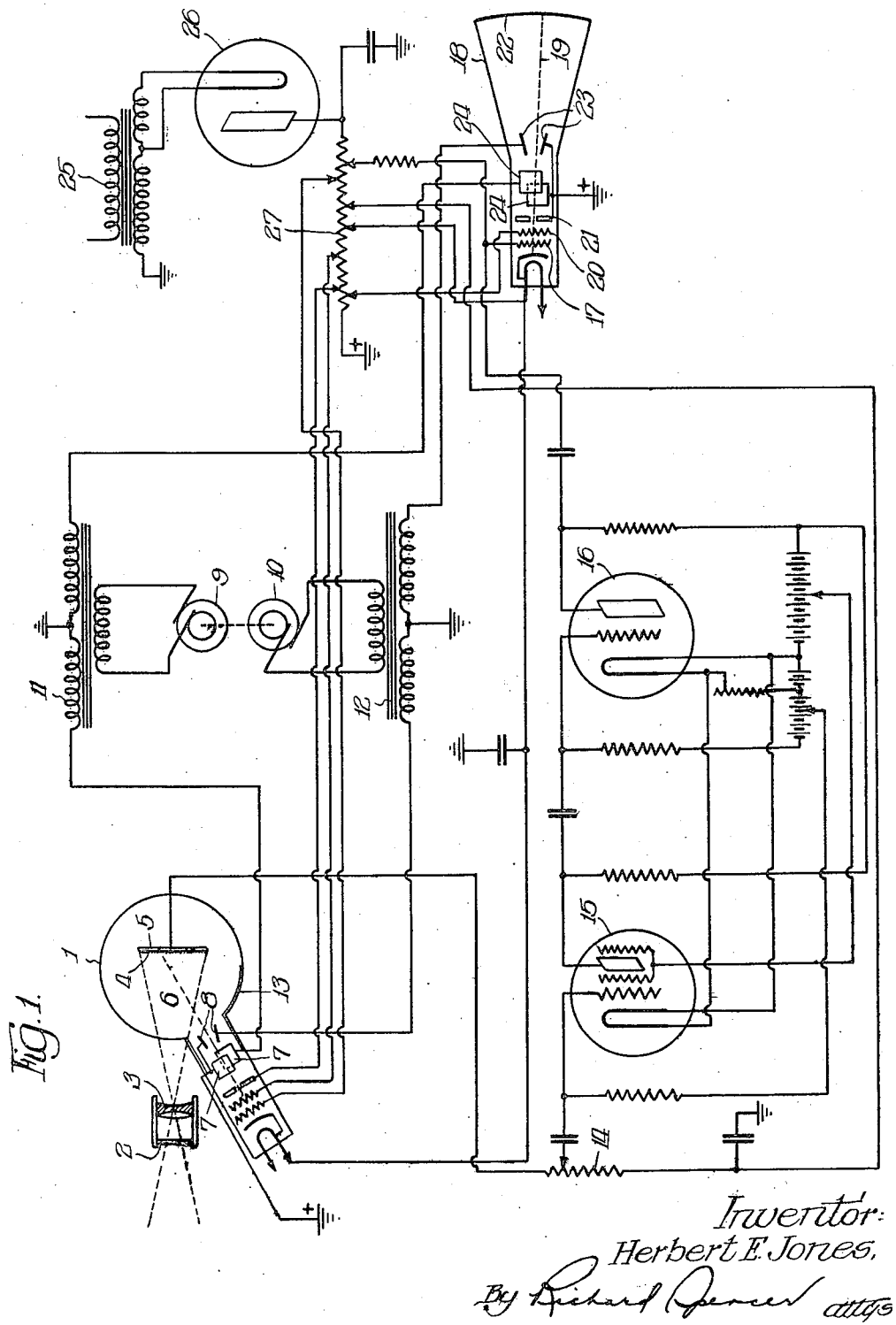
Inventor:
Herbert E. Jones,
By Richard Spencer attys Aug. 11, 1942.          H. E. JONES          2,292,641
GROUND SPEED INDICATOR FOR AIRCRAFT
Filed Feb. 28, 1938          2 Sheets-Sheet 2
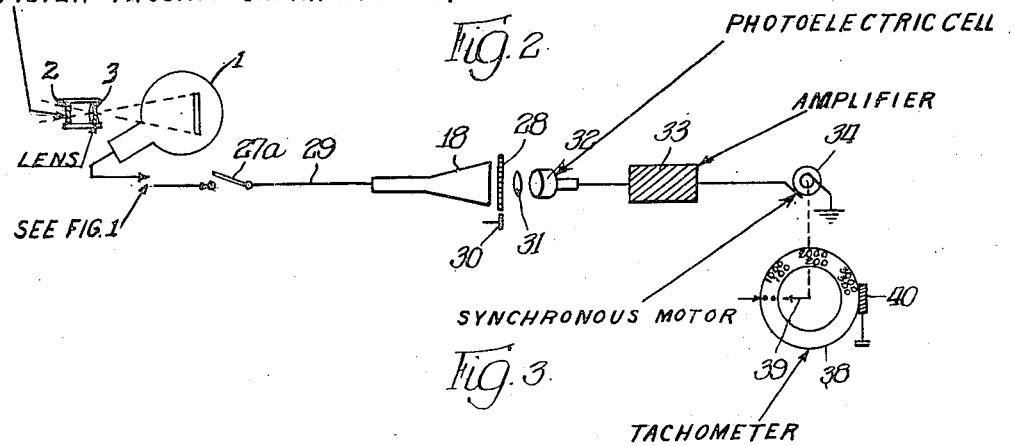
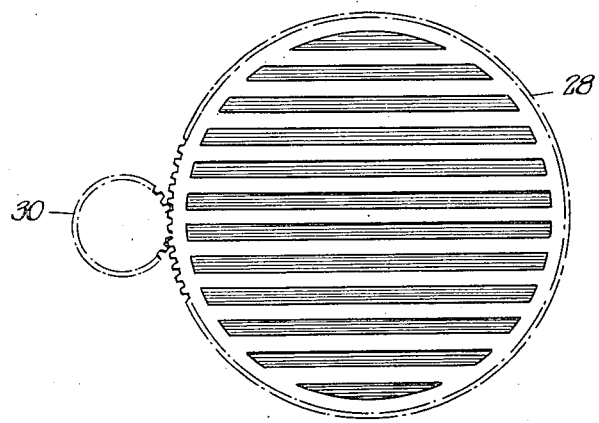
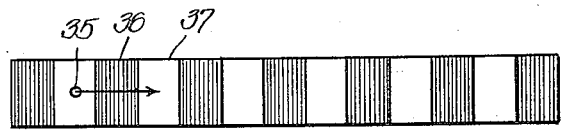
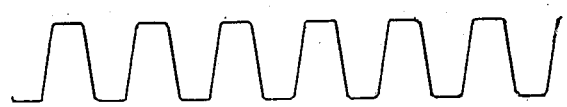
Inventor:
Herbert E. Jones,
By Richard Spencer
attys.

Patented Aug. 11, 1942

2,292,641

UNITED STATES PATENT OFFICE 2,292,641

GROUND SPEED INDICATOR FOR AIRCRAFT

Herbert E. Jones, Colorado Springs, Colo., assignor to Kansas City Testing Laboratory, Kansas City, Mo., a corporation of Missouri Application February 28, 1938, Serial No. 193,217

6 Claims. (Cl. 177—311.5)

This invention relates to improvements in ground speed indicators for aircraft.

It is an object of the invention to provide an instrument which will indicate on a dial the speed of an object passing between two given points in the field of view beneath an airplane whereby after correcting for absolute elevation the ground speed will be indicated. Other objects of the invention will appear hereinafter.

According to the invention a ground speed indicator is provided which includes a cathode ray transmitting tube, an electron gun, deflecting plates and a photo-electric mosaic screen in said tube, a cathode ray receiving tube, an electron gun, deflecting plates and a fluorescent screen in said receiving tube, means for impressing electrical impulses set up in the screen of the transmitting tube onto the control grid of the electron gun of the receiving tube, means for connecting the deflecting plates of said tubes to sweep circuits and a source of potential whereby the cathode beams in said tubes will scan the photo-electric screen and the fluorescent screen, respectively, in synchronism, a variable band screen associated with the cathode ray receiving tube in the path of the cathode beam, a photo-electric cell, means for focusing light passing through the variable band screen onto the photo-electric cell, means for amplifying the current set up in said cell by fluctuating light caused by said variable band screen, connections between said amplifying means and a synchronous motor and connections between said motor and a dial calibrated to indicate the speed of objects moving in the view of the transmitter.

Reference is here made to the applicant's copending application, Serial No. 737,311, dated July 27, 1934, which issued into Patent No. 2,121,771, dated June 21, 1938.

The invention will be further illustrated by the following description in conjunction with the accompanying drawings in which:

Fig. 1 illustrates suitable types of cathode ray transmitting and receiving tubes and connections between them;

Fig. 2 illustrates the arrangement of the cathode receiving tube with a variable band screen, lens, photo-electric cell, amplifying means, synchronous motor and recording means;

Fig. 3 illustrates a variable band screen;

Fig. 4 illustrates the direction of movement of objects across the bands of said screen, and;

Fig. 5 illustrates the fluctuations of light set up by the movement of objects across the bands of said screen.

Referring to Fig. 1, the transmitting tube consists of an iconoscope tube 1 which is a special cathode ray tube such as is used in television transmission. In the present case, however, this is preferably provided with a filter 2 capable of passing substantially infra-red rays only and a lens 3 for focusing the image of an object on a photo-electric screen 4. This photo-electric screen includes a plate of insulating material such as mica having a silver backing 5. The mica plate has thereon thousands of photosensitive globules, each of which is active photo-electrically and forms with the silver backing a tiny condenser. The photosensitive material is especially suitable for receiving infra-red radiation such as caesium oxide sensitized by a special process. Each small particle forms a tiny photocell in series with the condenser. As light falls on these cells a charge is built up proportional to the light intensity and is discharged in steady succession by a cathode ray beam.

The photo-electric screen in tube 1 is scanned by a cathode beam 6 by means of alternating current supplied to deflecting plates 7, 7 and 8, 8. The pair of plates 7, 7 is at right angles to the pair of plates 8, 8 and it is the resultant action of these two pairs of plates that causes the cathode beam to scan or to cover the whole area of plate 4. The alternating current causes an electrostatic field to be set up between these plates which varies in accordance with the frequencies of the current generated by generators 9 and 10 through the respective transformers 11 and 12. As this electrostatic field varies, the action upon the electron beam 6 causes it to be swung from one side of the plate 4 to the other. The plate 5 is maintained negative to the auxiliary anode 13 through the biasing resistor 14, but since the photo-electric globules on the plate 4 are separated from the plate 5, there is no conduction between the plate 4 and the anode 13 even though the photo-electric globules emit electrons. As the cathode beam 6 strikes a particular point on the plate 4, there is conduction set up between the plate 4 and the anode 13, each photo-sensitive globule acting as an individual photo-cell.

As the cathode beam 6 scans the plate 4 point by point, a current is developed between the plate 4 and the anode 13. Each particular point of this current is directly proportional to the intensity of light instant on the particular point. It is amplified by vacuum tube 15 and can be again amplified by as many stages as may be necessary. In the drawing, only one amplifying tube 15 is shown and a power tube 16 by means of which the current is finally amplified and is impressed on the control grid 17 of the cathode ray receiving tube 18.

The cathode ray receiving tube 18 is similar to the cathode ray oscillograph and is used as a television receiver. The cathode beam 19 of this tube passes through control grid 17 and is focused by the action of the two anodes 20 and 21 on fluorescent screen 22. The latter is composed of fluorescent material that will give off a greenish light when subjected to cathode ray bombardment, intensity of the fluorescent spot being directly proportional to the intensity of the cathode ray.

The cathode beam is caused to scan the fluorescent screen by deflecting plates 23, 23 and 24, 24 in the same manner as was described for beam 6 in tube 1. These deflecting plates are connected to the transformers 12 and 11, respectively, therefore, at any instant, the cathode beam 19 is in the same relative position as the cathode beam 6 and the two beams scan their respective screens in exactly the same manner with the exception that the pair of vertical deflecting plates in the receiving tube 18 is reversed with respect to the vertical deflecting plates in the tube 1, and similarly, the horizontal deflecting plates in receiving tube 18 are reversed with respect to the horizontal deflecting plates in transmitting tube 1. This is necessary in order to erect the image on the screen 22, since the transmitted image from plate 4 is inverted by means of the lens system 3.

As described above, the signal voltage from the plate 4 is impressed on the control grid 17 of the cathode grid tube 18 and this signal voltage is varying with the variations of light intensities on the plate 4. This varying voltage applied to the control grid 17 varies the intensity of the cathode beam 19. Therefore, the intensity of the cathode beam at any given instant is proportional to the light intensity on the particular point of plate 4 that is covered by cathode beam 6 at that instant, and since the two beams 6 and 19 scan their respective screens in synchronism, as was described above, the brightness of any particular point on the screen 22 will vary in accordance with the intensity of light on its corresponding point on plate 4. The power used by the cathode ray tubes and amplifiers is supplied by the same source of alternating current through transformer 25, the high voltages for the anodes of the tubes 1 and 18 being supplied by operating the rectifier 26, the difference in voltages and the positive and negative bias being given by the resistor 27.

In Fig. 2 the cathode ray receiving tube 18 is shown diagrammatically and is connected through a switch 27a to the cathode ray transmitting tube, not shown, in the manner previously described. As illustrated in Fig. 2, the receiving tube 18 is associated with a variable band screen 28 placed behind the fluorescent screen in the path of the cathode ray beam. The transmitting tube which is connected to receiving tube 18 through circuit 29 is pointed directly downward from the aircraft so that the fluorescent screen of tube 18 will give an image of the ground directly beneath the plane. Directly over the screen of tube 18 is placed variable band screen 28 having alternate transparent and opaque bands as illustrated in Fig. 3. Variable band screen 28 can be rotated in a plane parallel to the plane of the screen of tube 18 by means of gear 30. Screen 28 may be rotated either manually or automatically in connection with an automatic control, as described in my copending application, Serial No. 193,215 filed of even date herewith, now matured into U. S. Patent No. 2,237,440.

In accordance with my invention, screen 28 is rotated until the objects on the screen of receiving tube 18 move perpendicularly to the bands of screen 28. The light passing through screen 28 from the image on the screen of tube 18 is focused by lens 31 on a photo-electric cell or tube 32. The plate circuit of the photo-electric cell or tube 32 is amplified by an alternating current amplifier 33. The plate circuit of amplifier 33 drives a synchronous motor 34.

As bright objects pass across the field of tube 18 due to the movement of the aircraft, a fluctuating current will be set up in the plate circuit of photo-electric tube 32. The fluctuations in this current will be due to the variations in the light intensity caused by the objects passing the transparent and opaque bands of screen 28. This intensity will vary as shown in Fig. 4 when an object 35 passes the opaque and transparent bands 36 and 37.

The fluctuations in light intensity are translated to fluctuations in the voltage of the plate circuit in the output of amplifier 33. The cycles of this circuit will depend upon the speed of a bright object across the screen 28. The plate circuit of amplifier 33 is connected to a synchronous motor 34 whose speed depends upon the number of cycles per second in the plate circuit of photo-electric tube 32. Since the cycles of tube 32 are proportional to the speed of an object 35 across the field of the screen 28, the speed of the synchronous motor 34 will be proportional to the speed of the object 35 across the field of view. The dial 38 with pointer 39 is an ordinary tachometer indicating the speed of motor 34.

Since the ground speed of an airplane is not only a function of this speed but also a function of the absolute height above the ground, this dial 38 must be adjusted for elevation above the ground. This is accomplished by having the dial 38 rotate about its center and so calibrated with elevation above ground on the outside of ring 38 and ground speed on the inside of the ring that when the dial is rotated by gear 40 the pointer 39 will point to the ground speed of the airplane. The absolute elevation above ground can be found by the use of my navigation instrument described in my copending application Serial No. 193,216, filed of even date herewith, now matured into U. S. Patent No. 2,262,942.

Instead of depending on bright objects in the field, the instrument can be so arranged that it is responsive to objects darker than the field. Other variations may be made without departing from the invention.

Having thus described the invention, what I claim as new and desire to secure by Letters Patent of the United States is:

1. An apparatus for installation in aircraft to directly indicate the ground speed thereof comprising, in combination, means for translating the image of an object on the ground into electrical impulses, means for translating said electrical impulses into light signals moving with a speed proportional to the relative motion of the object on the ground, means for translating said light signals into alternating current in which the number of cycles per second is proportional to the speed of the object, and means for translating said alternating current fluctuations to a speed indicator.

2. An apparatus for installation in aircraft to directly indicate the ground speed thereof comprising, in combination, means for translating the image of an object on the ground into electrical impulses, means for impressing said impulses on the control grid of a cathode ray oscillograph having a fluorescent screen and thereby translating said impulses into light signals, means for translating said light signals into alternating current in which the number of cycles per second is proportional to the speed of an object across said screen, and means for translating said alternating current fluctuations into a speed indicator.

3. An apparatus for installation in aircraft to directly indicate the ground speed thereof comprising, in combination, means for translating the image of an object on the ground into electrical impulses, means for impressing said impulses on the control grid of a cathode ray oscillograph having a fluorescent screen and thereby translating said impulses into light signals, a variable band screen associated with said fluorescent screen in the path of the cathode beam of said cathode ray oscillograph for translating said light signals into alternating current in which the number of cycles per second is proportional to the speed of an object across said variable band screen, and means for translating said alternating current fluctuations to a speed indicator.

4. An apparatus for installation in aircraft to directly indicate the ground speed thereof comprising, in combination, means for translating the image of an object on the ground into electrical impulses, means for impressing said impulses on the control grid of a cathode ray oscillograph having a fluorescent screen and thereby translating said impulses into light signals, a variable band screen associated with the fluorescent screen in the path of the cathode beam, a photo-electric cell associated with said variable band screen, means for focusing light passing through the variable band screen onto the photo-electric cell and means for translating light fluctuations into ground speed.

5. An apparatus for installation in aircraft to directly indicate the ground speed thereof comprising, in combination, means for translating the image of an object on the ground into electrical impulses, means for impressing said impulses on the control grid of a cathode ray oscillograph having a fluorescent screen and thereby translating said impulses into light signals, a variable band screen associated with said fluorescent screen with parallel bands positioned perpendicularly to the path of the light signals moving across said screen whereby light fluctuations are set up beyond said variable band screen, means for converting said light fluctuations into alternating current in which the number of cycles per second is proportional to the speed of an object across said screen and means for translating said alternating current fluctuations to a speed indicator.

6. An apparatus for installation in aircraft to directly indicate the ground speed thereof comprising, in combination, a cathode ray transmitting tube, an electron gun, deflecting means for the beam from said gun, a photo-electric mosaic screen, a filter adapted to pass substantially infra-red rays only from an object to said screen and means for focusing said rays on said screen, a cathode ray receiving tube, an electron gun, deflecting means and a fluorescent screen in said receiving tube, means for impressing electrical impulses set up in the screen of the transmitting tube onto the control grid of the electron gun of the receiving tube, means for connecting the deflecting means of said tubes to sweep circuits and a source of potential whereby the cathode beams in said tubes will scan the photoelectric screen and the fluorescent screen in synchronism, a variable band screen associated with the fluorescent screen of the receiving tube with the bands positioned perpendicularly to the path of an object across said screen whereby light fluctuations are set up beyond said variable band screen, a photo-electric cell adapted to receive said light fluctuations and translate them into alternating current, means for amplifying the current set up in said cell, electrical connections whereby said current is connected to a synchronous motor and connections between said motor and a dial calibrated to indicate the speed of objects moving in the path of the cathode ray transmitting tube.

HERBERT E. JONES.